T. VILLAMOR.
AUTOMATIC MEASURING ROLLER MACHINE.
APPLICATION FILED APR. 6, 1916.

1,258,724.

Patented Mar. 12, 1918.
2 SHEETS—SHEET 1.

Inventor:
Tirso Villamor

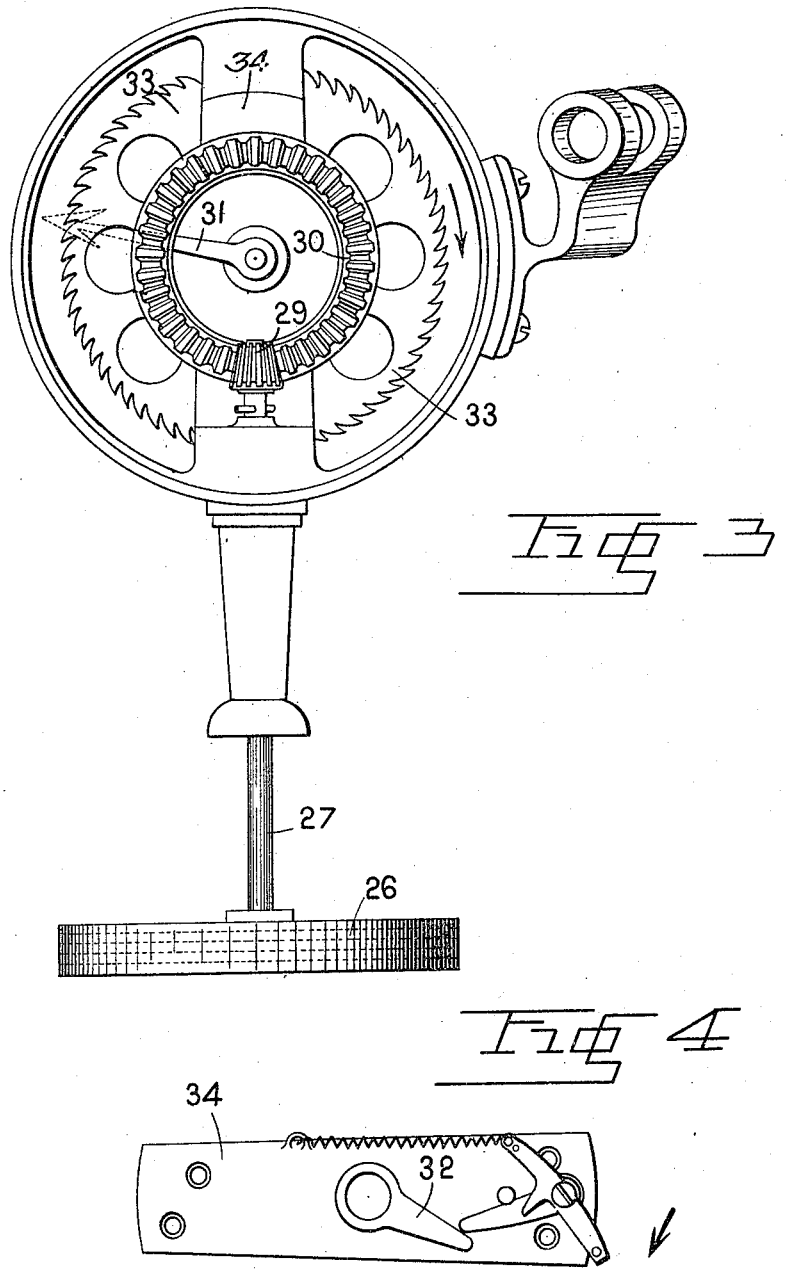

UNITED STATES PATENT OFFICE.

TIRSO VILLAMOR, OF ROSARIO DE SANTA FÉ, ARGENTINA.

AUTOMATIC MEASURING ROLLER-MACHINE.

1,258,724.   Specification of Letters Patent.   Patented Mar. 12, 1918.

Application filed April 6, 1916. Serial No. 89,468.

*To all whom it may concern:*

Be it known that I, TIRSO VILLAMOR, a subject of the King of Spain, residing at Mereno 899, Rosario de Santa Fé, Argentina, have invented certain new and useful Improvements in Automatic Measuring Roller-Machines, of which the following is a specification.

The present invention relates to cloth measuring machines, and provides a machine of simple and practical construction adapted for transferring a length of cloth from one support to another, by winding and unwinding the same, while measuring the length of cloth transferred, with great accuracy, irrespective of the diameter at any instant of the reel or the like from which the cloth is being unwound or onto which the cloth is being wound, and irrespective of the width of the cloth, whether single or double width.

The invention will be clearly understood from the following description, when taken in connection with the accompanying drawings, wherein is illustrated an embodiment of the invention as at present preferred.

Figure 1:
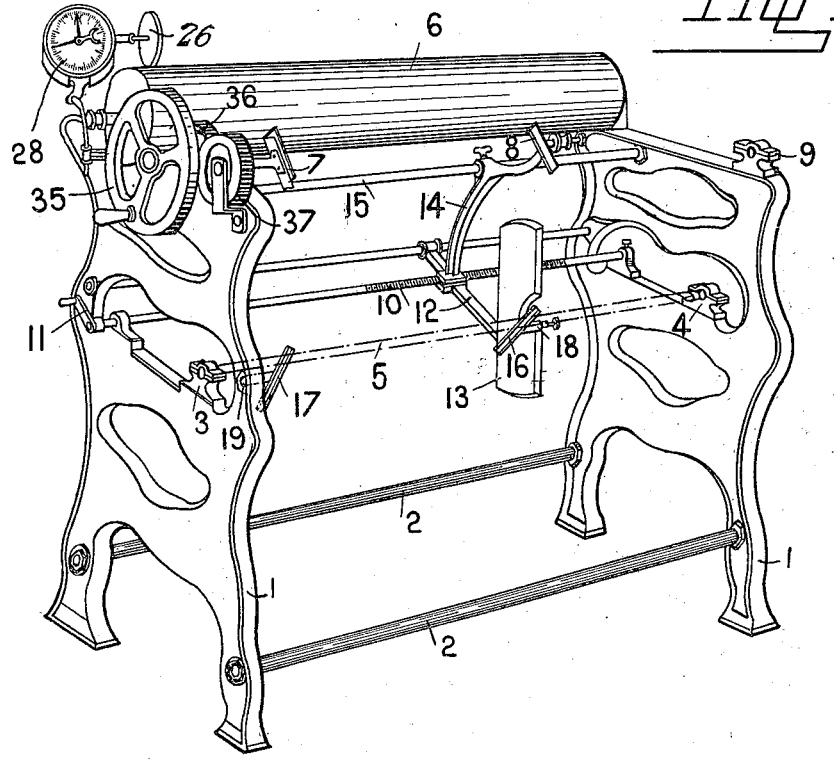
Figure 2:
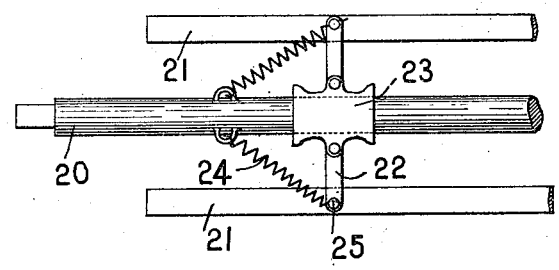

In these drawings,

Figure 1 is a perspective view of the machine, as adjusted for measuring single width cloth pieces;

Fig. 2 is a detail view, showing one end of a reel device adapted, together with the shaft 5 shown in Fig. 1 in dot dash lines, to be substituted for the members 7, 8, 16 and 17, shown in full lines in Fig. 1, to adapt the machine to double width cloth pieces; and Figs. 3 and 4 are detail views showing the interior construction of the length-registering mechanism.

The machine frame comprises a pair of end castings 1 joined by a plurality of tie rods 2. The machine is provided with a set of bearings 3 and 4 within which is adapted to be journaled a shaft 5. As this shaft is to be used in substitution for certain of the parts shown in full lines in Fig. 1, when cloth pieces of double width are to be measured, as hereinafter explained, the shaft is shown in dot and dash lines.

The numeral 6 indicates a drum or cylinder over which the length of cloth to be measured passes while it is being measured.

The numeral 7 represents a rotatable support for one end of the plank (not shown) of the usual type on which a length of cloth is to be wound after passing through the measuring means. The measuring means, as hereinafter described, is actuated by a wheel 26 frictionally driven by contact with the drum 6, which in turn is frictionally driven by the passage of the cloth thereover.

The support 7 has a fixed shank portion adapted to be attached to and rotated with a gear wheel 37, meshing with and driven by a gear wheel 36 on the same shaft with a hand driven wheel 35.

The numeral 17 represents a support, freely rotatable in a fixed bearing 19, for one end of the plank (not shown) of the usual type from which the length of cloth is to be unwound for passage over the drum to actuate the measuring means.

It will be understood that during the measuring operation, the cloth being unwound from the plank held by the support 17, passes up and under the drum 6, thence in back of and over the drum and then down and onto the plank held by the support 7; to these ends the plank held by the support 7 being directly rotated by the gears 36 and 37 by means of the hand wheel 35. As the widths of the pieces of cloth to be measured may be different, the machine is constructed accordingly, as follows: A continuous screw 10 is provided carrying a handle 11. A plate 13 is secured to the forwardly extending arm 12 of a three-armed bracket, threadedly mounted on the screw 10 at the junction of the three-armed bracket's three arms as indicated. The arm 14 is sleeved loosely on a transverse guide rod 15, the rearwardly extending arm of the bracket being sleeved loosely on a similar guide rod as shown clearly in Fig. 1. The arm 14 has journaled thereon a rotatable support 8 for the right end of the plank onto which the length of cloth is to be wound after passing through the measuring means, the support 8 being the mate of the support 7 rotatable with the gear 37. The front end of the arm 12 of the bracket carries not only the plate 13, but also a bearing 18 within which is freely rotatable a support 16 for the right end of the plank from which the length of cloth is unwound for passage through the measuring means, the support 16 being the mate of the support 17 rotatably mounted in the fixed bearing 9 at the left hand side of the machine. By turning the handle 11 to rotate the screw 10 in one direction or the other, the plate 13 and the rotatable supports 8 and 16 may all be moved toward or away from the left hand side of the machine, to prepare the machine to take different widths of cloths, as single and double widths; and as a consequence the length of the axis about which the piece of cloth is unwound before passing through the measuring means and the length of the axis about which the piece of cloth is rewound after passing through the measuring means, will always be the same irrespective of the width of cloth which the machine is to measure and to which the machine is to be adjusted.

When the piece of cloth to be measured is not of double width, and not taken off and wound onto planks held between the supports 17 and 16 and 7 and 8, the shaft 5 (shown in dot dash lines in Fig. 1) is mounted in the bearings 3 and 4, in substitution for the supports 17 and 18, and a reel device including the axle 20 shown in Fig. 2, is secured at its left hand end (the end illustrated in Fig. 2) to the gear wheel 37, to turn therewith in substitution for the supports 7 and 8, the right hand end of the axle 20 (not shown) being journaled in a bearing 9 the axis of which is alined with the axis of the gear wheel 37. Before substituting the shaft 5 and the reel device illustrated in Fig. 2, the handle 11 is actuated to shift the bracket 12—14 a suitable distance until the bracket is moved close to the right hand end of the machine and the piece 13 is properly positioned, and the rotatable plank-end supports 7, 8, 16 and 17 are detached, suitable screws being provided for the purpose as indicated in the case of the support 16. The bearings 3, 4 and 9 have removable tops, as indicated, to facilitate rearrangement of the machine as described. Suitable provision may be made for quickly detaching the support 7 from the gear wheel 37 and for substituting the left hand end of the axle 20 of the reel device shown in Fig. 2, so that said end of said axle will be supported and keyed to the wheel to cause the axle and wheel to rotate as one unit; for example, said end of the axle may be square, as indicated in Fig. 2, and an appropriate recess, not shown, provided in the gear wheel. The front edge of the plate 13 is cut away as shown in Fig. 1, so that the retention of the plate 13 on the bracket 12—14 does not interfere with the installation of the shaft 5.

It will be understood that when the shaft 5 is substituted for the supports 17 and 18 and the reel device of Fig. 2 is substituted for the supports 7 and 8, the roll of cloth to be measured is hung on the shaft 5 and unwound therefrom and passed up and under the drum 6, thence in back of and over the drum and then down and onto the reel device attached at its left hand end to the gear wheel 37 and journaled at its right hand end in the bearing 9.

The reel device comprises the central driving axle 20, and a pair of parallel oppositely offset rods 21, each pivotally connected by means of a link 22 to one of a pair of collars at opposite ends of the axle, one of which collars is shown at 23 in Fig. 2. Springs 24 maintain the links 22 perpendicular to the axis of the axle 20, thereby to maintain the rods 21 at their maximum extension away from the axle and give the reel device its maximum width. According to this arrangement, the rods 21 may be given parallel movement relative to the axle 20, to diminish the width of the reel device, to facilitate removal of the measured piece of cloth when wound thereon.

In order to be sure that the cloth is properly rewound after being measured by its passage over the drum 6, the drum is desirably equipped with a suitable brake (not shown) by which the speed of rotation of the drum may be regulated.

The measuring means comprises a casing 28, having a dial appropriately marked to coact with meter and centimeter hands as indicated in Fig. 1. The mechanism inside the casing for causing the hands to rotate is driven by a friction wheel 26 mounted on a shaft 27 and coacting with the drum 6, the circumference of the friction wheel being properly calculated, relative to the parts inside the casing and the dial, so that as the drum is rotated by the passage of the cloth thereover, the wheel 26 is frictionally rotated by its contact with the drum to cause the measuring means to register exactly at any instant the length of cloth which has passed beyond the point of contact between the friction wheel and the drum. As shown in Figs 3 and 4, the shaft 27 has secured on its inner end a beveled pinion 29, which meshes with a beveled gear 30 journaled in a bridge 34 in the casing; a centimeter hand 31 rotating with the gear 30. A wiper arm 32 also rotates with the gear 30, and once at each revolution of the gear 30 and hand 31, which operation represents 100 centimeters on the periphery of the wheel 26, the wiper arm coacts with a suitable mechanism, such as that indicated in Fig. 4, to rotate a ratchet 33 one or more teeth to cause the meter hand, driven in any suitable manner (not shown) by the ratchet, to register a meter on the dial.

I claim:

1. A machine for rolling and measuring cloths of various kinds, comprising a supporting frame; cloth measuring means; interchangeable rotatable dissimilar supports for the cloth; means for rotating one of the supports for moving the cloth through the measuring means; the machine having bearings for the supports so that one type of support may be substituted for another, to take care of cloths of single or double widths; one set of said supports being adapted to support and hold a plank of the type about which a bolt of cloth may be wound; another of said supports, adapted to be substituted for the set of supports last-mentioned, being a reel device comprising an axle, a plurality of parallel rods offset from the axle, a plurality of links pivotally connecting the rods to the axle, and spring means holding the rods spaced from the axle, whereby the rods may be moved toward each other and the axle to facilitate the removal of a length of cloth wound thereon; the measuring means comprising a drum over which the cloth is drawn to frictionally rotate the drum, a registering mechanism, and a friction wheel in contact with the drum and frictionally rotated thereby, whereby the registering mechanism registers the length of cloth passing over the drum irrespective of the width, thickness, length and percentage unrolled and rerolled of the cloth being measured; substantially as described.

2. A machine for rolling and measuring cloths of various kinds, comprising a supporting frame; cloth measuring means; interchangeable rotatable dissimilar supports for the cloth; means for rotating one of the supports for moving the cloth through the measuring means; the machine having bearings for the supports so that one type of support may be substituted for another, to take care of cloths of single or double widths; one set of said supports being adapted to support and hold a plank of the type about which a bolt of cloth may be wound; said set of supports comprising a pair of end supports for the corresponding ends of planks of the usual type, one plank for having unwound therefrom the bolt of cloth to be measured and the other for having wound thereon the bolt of cloth while being measured, a pair of end supports for the opposite ends of the planks, a bracket provided with a thread and carrying the two end supports last mentioned, and a screw having a thread engaging the thread of the bracket and actuable to adjust the supports for planks of the same length; the measuring means comprising a drum over which the cloth is drawn to frictionally rotate the drum, a registering mechanism, and a friction wheel in contact with the drum and frictionally rotated thereby, whereby the registering mechanism registers the length of cloth passing over the drum irrespective of the width, thickness, length and percentage unrolled and rerolled of the cloth being measured; substantially as described.

3. A machine for rolling and measuring cloths of various kinds, comprising a supporting frame; cloth measuring means; interchangeable rotatable dissimilar supports for the cloth; means for rotating one of the supports for moving the cloth through the measuring means; the machine having bearings for the supports so that one type of support may be substituted for another, to take care of cloths of single or double widths; one set of said supports being adapted to support and hold a plank of the type about which a bolt of cloth may be wound; another of said supports, adapted to be substituted for the set of supports last-mentioned, being a reel device comprising an axle, a plurality of parallel rods offset from the axle, a plurality of links pivotally connecting the rods to the axle, and spring means holding the rods spaced from the axle, whereby the rods may be moved toward each other and the axle to facilitate the removal of a length of cloth wound thereon; the set of supports first-mentioned comprising a pair of end supports for the corresponding ends of planks of the usual type, one plank for having unwound therefrom the bolt of cloth to be measured and the other for having wound thereon the bolt of cloth while being measured, a pair of end supports for the opposite ends of the planks, a bracket provided with a thread and carrying the two end supports last-mentioned, and a screw having a thread engaging the thread of the bracket and actuable to adjust the supports for planks of the same length; the measuring means comprising a drum over which the cloth is drawn to frictionally rotate the drum, a registering mechanism, and a friction wheel in contact with the drum and frictionally rotated thereby, whereby the registering mechanism registers the length of cloth passing over the drum irrespective of the width, thickness, length and percentage unrolled and rerolled of the cloth being measured, substantially as described.

TIRSO VILLAMOR.

Witnesses:
JESÚS RODRIGUEZ,
PABLO CARBONE.